United States Patent [19]
Durance et al.

[11] Patent Number: 5,962,057
[45] Date of Patent: Oct. 5, 1999

[54] PROCESS FOR DRYING MANGO AND PINEAPPLES

[75] Inventors: Timothy Douglas Durance; Jian Hua Wang, both of Vancouver, Canada; Richard Schlomer Meyer, Tacoma, Wash.

[73] Assignee: The University of Bristish Columbia, Vancouver, Canada

[21] Appl. No.: 09/106,463

[22] Filed: Jun. 30, 1998

[51] Int. Cl.⁶ .................................. A23B 7/00; H05B 6/00
[52] U.S. Cl. ................ 426/465; 34/259; 34/263; 219/701; 426/289; 426/242; 426/640
[58] Field of Search ................... 426/465, 289, 426/242, 640; 219/678, 701; 34/259, 263

[56] References Cited

U.S. PATENT DOCUMENTS

| | | | |
|---|---|---|---|
| 4,341,803 | 7/1982 | Koshida et al. | 426/242 |
| 4,859,487 | 8/1989 | Matsumura | 426/465 |
| 4,948,609 | 8/1990 | Nafisi-Movaghar | 426/640 |
| 5,020,237 | 6/1991 | Gross et al. | 34/265 |
| 5,135,122 | 8/1992 | Gross et al. | 34/259 |
| 5,458,898 | 10/1995 | Kamper et al. | 426/289 |

OTHER PUBLICATIONS

"Principles of Food Chemistry is 7y", John M. de Mam (Second Edition), pp. 97–99.
"From the Field", Food Engineering, Jul. 1988, pp. 81–84.
"Microwave Application in Vacuum Drying of Fruits", Drougas et al, Journal of Food Engineering, 28 (1996), pp. 203–209.

Primary Examiner—George C. Yeung
Attorney, Agent, or Firm—C. A. Rowley

[57] ABSTRACT

A vacuum microwave dehydration process for drying fresh mango and pineapple fruit pieces at low temperatures which results in a product with a "fresh", uncooked flavor and a unique crunchy texture with little or no shrinkage which can not be achieved through conventional air drying.

7 Claims, 1 Drawing Sheet

PROCESS FOR DRYING MANGO AND PINEAPPLES

FIELD OF THE INVENTION

The invention pertains to vacuum microwave drying of fresh mango and/or pineapple fruit pieces to produce an improved dried product.

BACKGROUND OF THE INVENTION

In Pacific Rim countries, mango and pineapple are a very popular fruits. These fruits generally are not dried below a water activity of 0.4 and even when air dried below 0.70 water activity, both these fruits (pineapple and mango) become tough with an undesirable texture, color and a less than desirable cooked flavor. As a result dried mangos and pineapples have not become popular dried fruits U.S. Pat. No. 4,341,803, Koshida, issued Jul. 27, 1982 discloses a method for producing dried fruit chips in which starting fruit chips having an adjusted water soluble sugar concentration (6 to 25%) are freeze-dried to reduce the moisture content to a predetermined moisture content range (between 15 to 60%). The freeze dried fruit chips are vacuum microwave-dried to further reduce the moisture content to a second predetermined range (between 10 and 40%); then the vacuum microwave-dried fruit chips are vacuum dried to further reduce the moisture content (below 5%) to a range suitable for ready eating as a snack. The patent stresses that all three steps are essential to produce a suitable product. The porous snack, so produced has a high density since it is infused with 6% to 25% sugar and the final product has 29% to 63% sugar content.

U.S. Pat. No. 5,020,237 Gross, issued Jun. 4, 1991 and U.S. Pat. No. 5,135,122 Gross, Aug. 4, 1992 each describe a method and apparatus for vacuum dehydrating fruit and vegetables to a moisture content below 15% but preferably below about 5%, using the combined infrared energy and microwave energy simultaneously to produce a dried product that retains its natural flavor, a puffed appearance and crisp texture (about 3% moisture). The process applies microwave energy to drive the internal moisture out and infrared energy to dry the surface which when applied simultaneously speed up drying. This technique subjects the fruit to drying temperatures in the order of about 95° C. and the final product takes on "cooked" flavors.

U.S. Pat. No. 4,948,609, Nafisi-Movaghar issued Aug. 14, 1990 discloses a vacuum oven drying process to produce a crispy, tender, puffed dried fruit or vegetable product with no discoloration. The fruits and/or vegetables are first frozen and thawed to tenderize, infused with various additives to prevent browning (about 25 to 45% sugar along with an acid and chelating agent) then dried at atmospheric pressure and at a temperature between 35 and 75° C. to a moisture level of between 10 and 45%. The intermediate product so produced is then vacuum dried at temperatures between 50 and 125° C. (66° C. used with fruits) on heated trays to less than 5% moisture. The fruit changes from a "fresh" flavor to a "cooked" flavor when held at these temperatures for the period of time required to complete the drying.

The publication "New drying technology makes dried fruits taste like fresh" Author unknown Food Eng. V. 60, n. 7, 1988 pages 81, 82 and 84 describes a process for drying grapes by submersion of the grapes in heated paraffin wax at a very low pressure until 50 to 65% of the grape moisture is removed then subjecting the grapes to a three step vacuum microwave drying process to produce a puffed, dried grape product. In the first vacuum microwave drying step, the grapes are dried under a 20 Torr vacuum, 65 to 80° C. temperature for 30 to 40 minutes at 2.5 to 3. KW power. The second step is at less than 20 Torr vacuum, 65 to 80° C. for 20 to 30 minutes at 1 to 2 KW power. The final step is at less than 20 Torr vacuum, temperature not reported for 30 to 40 minutes at 0.25 to 0.5 KW. The grapes are held another 15 to 20 minutes under vacuum with no microwave power and allowed to cool and set. The resulting grape has a hard, dense exterior and a hollow center and have a cooked flavor.

The publication "Principles of Food Chemistry" second edition, John M. deMan published by Van Nostrand Reinhold pages 97–99 discusses denaturation of fruits when subjected to drying temperatures.

Drouzas and Schubert, in an article entitled "Microwave application in drying fresh fruits" Journal of Food Eng. V.28, n.2 (1996) 1996, pages 203–209 describe a microwave vacuum dehydration process for drying bananas. The process involves drying banana slices in a domestic microwave oven (Sharp 5V12W) at 70° C. at 25 mbar vacuum at 0.15 KW power over a 30 minute period to a moisture content of 5 to 8%. The power was pulsed on 10 seconds and off 20 seconds. The resulting banana rehydrated in half the time compared to an air dried banana and absorbed twice as much moisture. The dried product was recommended for baking.

SUMMARY OF THE INVENTION

It is the object of the present invention to provide a process for producing tender textured, "fresh flavored", dried mango and pineapple products.

The invention involves a unique vacuum microwave dehydration process designed for dehydrating mango and/or pineapple fruit pieces wherein the mango and pineapple fruit pieces are dried under vacuum microwave conditions without subjecting the fruit pieces to a temperature of greater than 65° C., preferably no higher than 60° C., by first coating the fruit pieces with sugar, storing the coated fruit pieces to permit diffusion of the sugar, air drying to a moisture content of between 30 and 40% moisture based on the wet weight of the fruit pieces, and then vacuum microwave drying the air fruit pieces in two stages wherein a first of the two stages applies microwave power of between 1 and 8 KW/Kg of wet fruit pieces preferably 3 to 5 KW/Kg at a vacuum pressure of at least 25 inches Hg for a time required to reduce the moisture content to between 20 and 25% moisture based on the wet weight of the fruit pieces followed by a second stage at a lower microwave power level and at a vacuum pressure of at least 25 inches of Hg., preferably at least 28 in Hg to produce a dried mango and/or pineapple fruit pieces having significantly improved the texture and flavor substantially free of cooked flavor.

BRIEF DESCRIPTION OF THE DRAWINGS

Further features, objects and advantageous will be evident from the following detailed description of the preferred embodiments of the preset invention taken in conjunction with the accompanying drawings in which.

DETAILED DESCRIPTION OF THE INVENTION

Figure 1:
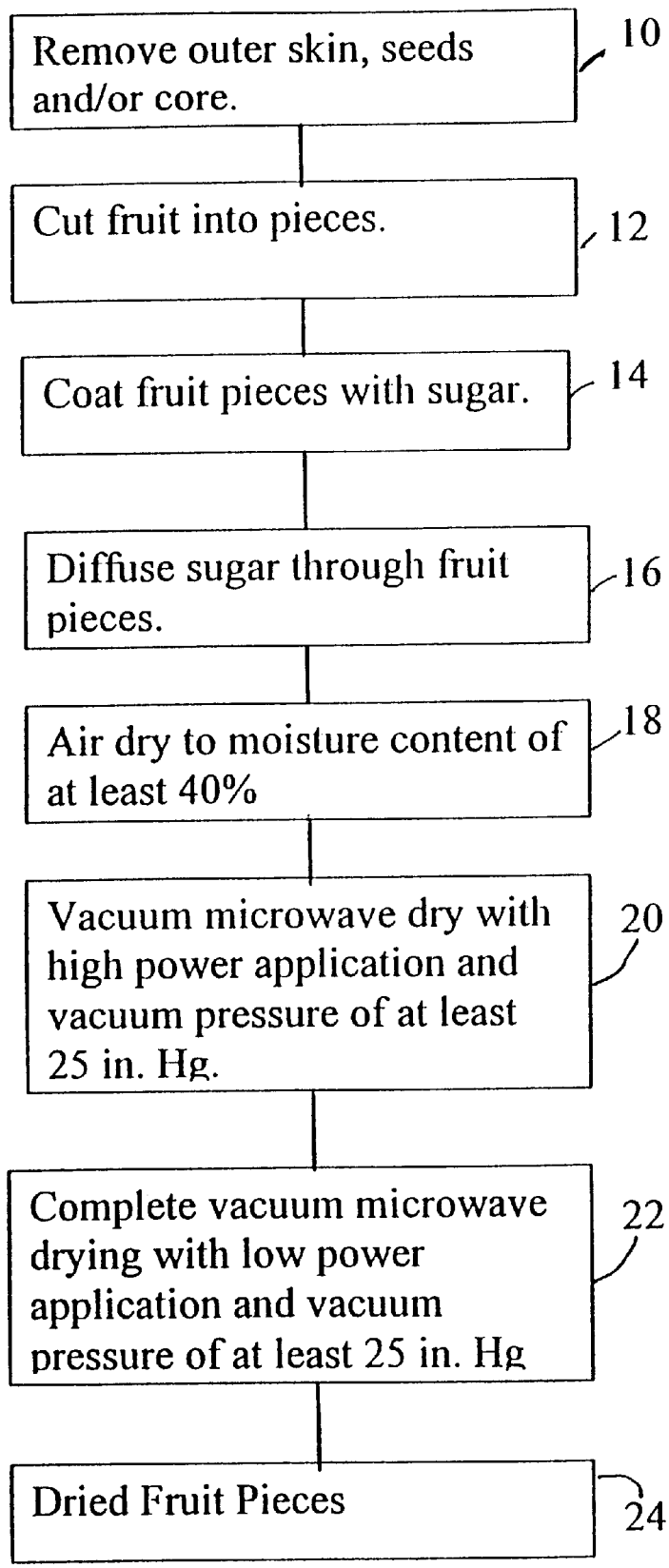
FIG. 1 is a schematic flow diagram showing the steps of the method of the present invention.

The present invention provides a new process for drying mango and/or pineapple so that a tender texture and a "fresh flavor" are achieved.

Fresh mangos are peeled, the seed removed and cut into pieces. Similarly with pineapples the outer skin is removed and the fruit cored and cut into pieces (See Steps 10 and 12 in FIG. 1). The pieces have a maximum dimension (length or width) of no more than 0.7 inches are preferably less than 0.6 inches. It is also preferred the pieces be cubes.

The mango and/or pineapple pieces, are coated with powdered sugar as indicated at Step 14 using a ratio of 100 parts by weight mango or pineapple pieces and 4.5 to 5.5 parts by weight powdered sugar and the pieces stored to permit the sugar to infuse into the fruit (Step 16). This step normally takes a 1 to 16 hour equilibration period, preferably 1 hour, while being held in a sealed container. Preferably the temperature will be in the order of about 2 to 10° C. during the infusion period. If the time is greater than about 3 hours the coated pieces need to be refrigerated.

The fruit pieces are then air dried as indicated at Step 18 to reduce their moisture contents from their original moisture content (about 75% moisture based on the wet weight of the fruit pieces) to less than 40% but greater than 25% moisture based on the wet weight of the fruit pieces in a conventional air dryer at temperature of less than 65° C. and preferably less than 60° C. and most preferably less than 50° C. to produce air dried fruit pieces. The air flow during the air drying preferably is in the order of 100,000 liters/minute to 160,000 liters/minute for a time not greater than 120 minutes The air dried fruit pieces are then loaded into a vacuum microwave drying chamber, preferably of a rotating drum type which produces more even drying, however other types of microwave dryers may be employed provided they can achieve the required uniform drying at the required power application in the required time and the vacuum microwave dried (VMW) as indicated at 20.

It is extremely important that the temperature to which the fruit pieces are subjected during the drying operations not exceed 65° C. more preferably 60° C. for any significant length of time so that cooking of the fruit pieces is avoided as subjecting the fruit pieces to a temperature above 65° C. will result in the dried fruit pieces having a distinctive cooked flavor as opposed to a flavor closer to that of the fresh fruit.

The vacuum maintained in the microwave chamber is maintained at an absolute pressure of below 22 inches of Hg. (It is to be understood the higher the number of inches of Hg. the lower the absolute pressure). Preferably the pressure will be reduced to a vacuum greater than 25 inches of Hg. to ensure the temperature in the chamber during evaporation of water remains well below 65° C. (150° F.). In commercial operations, it is expected that in most cases the low pressure will be reduced to a vacuum greater than 28 inches of Hg. and the temperature is held below 37° C. (98° F.).

The higher the vacuum pressure, i.e. less vacuum, the longer the drying time and the higher the temperature required for drying, i.e. the material being dried must be subjected to a higher temperature to evaporate water. The higher the temperature to which the fruit pieces are subjected, the more likely the fruit pieces are to lose their "fresh" flavor (cooked flavors develop above 65° C. (150° F.)). It is therefore preferred to use the highest achievable vacuum and minimize the time and temperature required to dry the fruit pieces to thereby minimize the loss of flavor.

The microwave power applied to the chamber is important. The higher the microwave power applied to the fruit pieces the shorter the required drying time, but if the power is too high, for too long, spotty burning of the fruit will occur. Too low an application of microwave power applied to fruit cubes is detrimental as it extends drying time and allows enzymes, like polyphenol oxidase to brown the fruit cubes and alter the color and flavor; in addition, it will cause the fruit cubes to shrink. Generally, the microwave power applied will be in the range of 1 and 8 KW/Kg of fresh fruit cubes being processed. The use of low power application is not preferred as the process may become too slow and the flavor and color of the fruit cubes damaged as above described. Application of high power, i.e. above 8 KW/Kg of fresh fruit cubes makes controlling the uniformity of the drying process at low moisture content (i.e. below 20% moisture) more difficult. Generally an application of microwave power of about 3 to 5 KW/Kg i.e. about 4 KW/Kg of fresh fruit cubes is preferred.

Drying time is controlled by the amount of vacuum and the power applied to the fruit cubes in the chamber. It is preferred to operate the vacuum chamber using the lowest vacuum pressure (and thus the lowest drying temperature) and the highest application of microwave power provided that the power is not applied to the extent that it causes damage the fruit cubes being treated and that it completes the drying quickly while subjecting the fruit cubes to a minimum required drying temperature. The vacuum and power applied will be tuned to obtain the required drying without imparting a cooked flavor to the product using the most economically favorable conditions.

The microwave power available for use commercially have frequencies of 2450 MHz and 915 MHz, both of which may be used, but 2450 MHz is preferred.

The pressure in the chamber should be sufficiently low to ensure the temperature of the pieces does not exceed about 65° C. (150° F.) and less than 45° C. (113° F.) is considered most appropriate.

When the dryness of the fruit cubes approaches 20% moisture content, a second stage of MVD as indicated at 22 is applied wherein the application of microwave power is reduced significantly (i.e. by at least 50 % of that used in step 20 and in any event to a low power application less than 2 KW/Kg of the fruit cubes) and it is applied at this rate to reduce the moisture content of the fruit cubes to between 8 and 12%.

The drying deemed completed when the moisture content of the fruit is reduced to at least 15% based on the wet weight of the fruit, preferably between 8 and 12% based on the dry weight of the fruit to produce the final dried fruit product as indicated at Step 24.

EXAMPLE I

Fresh mangos are peeled, the seed removed and cut into 12 mm by 12 mm by 8 mm cubes. The cubes are coated with powdered sugar at a ratio of 94% mango cubes (81.7% moisture) and 6% powdered sugar. The sugar is allowed to infuse into the mango cubes over a 3 hour equilibration period, while being held at 4° C. in a sealed container. The sugar imparts sweetness to the fruit.

One sample of the mango cubes (1,086 grams) are dried from 75% moisture to 38% moisture in an Versa-belt Air Dryer (90 minutes at 50° C. with an air flow at 2.56 cubic meters per second). The mango cubes (308 grams after air drying) are then loaded into a circular, plastic drum with four sections. The loaded drum is placed into the vacuum microwave chamber and a vacuum is pulled to 27.0 inches of Hg. The drum is rotated at 6 rpm in the microwave chamber to allow uniform drying. The mango cubes are subjected to 4 KW for 4 minutes and 15 seconds and then 1 KW for 90 seconds. At this vacuum level, the dehydration temperature is 45° C. (113° F.). The resulting mango cubes have a water activity of 0.30, moisture content of 9.0% and a final weight of 221 grams.

Another sample of the sugar infused mango cubes were processed for 16 hours at 60° to 80° C. in the Versa-belt Dryer at which point the process was stopped. The initial mango wet weight was 475 grams and final dried weight was 89 grams. Due to the limitations of conventional air drying, a water activity of 0.40 (moisture content Of 10.8%) was the lowest level achievable.

Moisture content of the mango cubes were determined using mango cubes 2 mm square dried in a drying oven at 121.1° C. (250° F.) until the weight of the samples became constant (about 20 hours).

Water activity was measured in a Cx-2 Aqua Lab device (Decagon Devices, Inc.). Four random samples of mango pieces from each test were measured.

Texture was measured using a TA XT2 Texture Analyzer (Texture Technologies Corp.) which was equipped with a 3.0 mm diameter, flat end punch and a 10.0 mm punch hole. Samples are placed between the punch and punch hole; the punch is lowered at a rate of 2.0 mm/second and the force to fracture the mango cube is recorded. This procedure is repeated on 10 samples for each treatment.

Density was measured using the volume displacement method where samples are mixed with rapeseed and the volume re-measured with the samples removed. The density is then calculated from the difference in volume. The density was measured on 5 samples per treatment.

TABLE 1

Texture Results for Mangos

| Treatment | First Fracture Point Force (average) | Standard Deviation |
|---|---|---|
| Air dried/microwave vacuum dried | 18.56 | 9.83 |
| Air dried | 368.90 | 165.52 |

It is apparent that the air dried/microwave vacuum dried treatment of the present invention produced dried product about 20 times less tough than the air dried product.

TABLE 2

Density Results for Mangos

| Treatment | Volume* | Standard Deviation | Average density (kg/cubic meter) | Standard Deviation |
|---|---|---|---|---|
| Air dried/ microwave vacuum dried | 82. | 4.36 | 470.45 | 55.56 |
| Air dried | 35. | 2.94 | 1250. | 166.67 |
| Raw mango | 190.0 | 0.58 | 1038. | 15.71 |

*Volume of a 12 mm × 12mm × 8 mm cube expressed as cubic cm.

The air dried/microwave vacuum dried mango produced using the present invention had roughly ½ the volume and ½ the density of the raw mango while air dried mango had about ⅕$^{th}$ the volume and about 20% greater density compared to raw mango. Air dried had nearly 3 times greater density compared to air dried/microwave dried mango and about ⅔$^{rd}$'s the volume. Air dried/microwave vacuum dried mango had the least dense texture which would help account for it's less tough texture compared to air dried mango and thus its improved taste and texture.

EXAMPLE 2

Fresh Hawaiian pineapples are peeled, cored and sliced into 13 mm ×13 mm ×11 mm cubes (set 1) and 2 mm×20 mm×11 mm cubes (set 2). The cubes are mixed with powdered sugar at the ration of 100 parts cubes and 5 parts sugar and allowed to infuse over a 3 hour period, to impart a sweet flavor to the fruit and prevent sticking to the dryer belt. The pineapple cubes are dried on a Versa-belt air dryer (60° C. for 40 minutes) to remove to remove about 60% (set 1) and 70% (set 2) % of the water by weight based on the wet weight of the fruit. The pineapple cubes are loaded into a circular, plastic drum, which is divided into four sections. The loaded drum is placed into the microwave chamber and a vacuum is pulled to 27.0 inches of Hg. The drum is rotated at 6 rpm in the microwave chamber to allow uniform drying. The pineapple cubes are subjected to: set 1. 4 KW for 23 minutes and 2.0 KW for 4 minutes and set 2. 4.0 KW for 10.0 minutes and 2.0 KW for 8 minutes. In both sets, the air flow in the chamber is 7 liters per minute.

The air dried pineapple cubes were processed in exact same manner as described for the vacuum dried pineapple cubes above except the cubes were processed in the air dryer for 12 hours at 60° to 80° C. The initial weight was 1.6 Kg and final weight was 176 grams with a water activity of 0.31 (13.8% moisture).

To measure moisture content, the pineapple cubes were cut into 2 mm square pieces and were dried in a drying oven at 121.1° C. (250° F.) until the weight of the samples became constant (about 20 hours).

Water activity was measured in a Cx-2 Aqua Lab device (Decagon Devices, Inc.). Four random samples of pineapple pieces from each test were measured.

Texture was measured using a TA XT2 Texture Analyzer (Texture Technologies Corp.) which was equipped with a 3.0 mm diameter, flat end punch and a 10.0 mm punch hole. Samples are placed between the punch and punch hole; the punch is lowered at a rate of 2.0 mm/second and the force to fracture the pineapple cube is recorded. This procedure is repeated on 10 samples for each treatment.

Density was measured using the volume displacement method where samples are mixed with rapeseed and the volume re-measured with the samples removed. The density is then calculated from the difference in volume. The density was measured on 5 samples per treatment.

TABLE 3

Texture results for pineapples

| Treatment | First fracture point Force (ave.) | Standard Deviation | *Second fracture point force (ave.) | Standard Deviation |
|---|---|---|---|---|
| Air dried/ microwave vacuum dried | 24.37 | 11.22 | 22.78 | 6.68 |
| Air dried | 38.77 | 17.39 | 272.78 | 168.18 |

*The second fracture point is the second peak attained as the punch penetrates through the material.

The air dried/microwave vacuum dried product produced using the present invention was about 60% as tough as air dried pineapple, but is brittle versus the elastic texture of air dried pineapple. The second fracture points out that air dried/microwave vacuum dried has a crispy texture versus the taffy like elastic texture of air dried pineapple.

TABLE 4

Density results for pineapples

| Treatment | Volume* | Standard Deviation | Average density (kg/cubic meter | Standard Deviation |
|---|---|---|---|---|
| Air dried/ microwave Vacuum dried | 62.75 | 1.89 | 525.03 | 68.02 |
| Air dried | 28.00 | 0.82 | 888.89 | 62.99 |
| Raw pineapple | 165.75 | 12.84 | 1042.3 | 44.51 |

*Volume of a 20 mm × 20 mm × 11 mm cube expressed as cubic cm.

It will be apparent that the air microwave dried pineapples produced using the present invention had a significantly different density from the conventional air product i.e. the pineapple of the present invention has a density of about 60% of that of the conventionally air dried product and more than twice the volume to provide a significantly better product in that it is significantly less tough to chew and is more crunchy i.e. more brittle than the conventionally air dried product.

Having described the invention modifications will be evident to those skilled in the art without departing from the spirit of the invention as defined in the appended claims.

We claim:

1. A vacuum microwave dehydration process for dehydrating mango and/or pineapple fruit pieces wherein said mango and/or pineapple fruit pieces are dried without subjecting the fruit pieces to a temperature of greater than 65° C., the process comprising the steps of first coating said fruit pieces with sugar to provide coated fruit pieces, storing said coated fruit pieces for a time sufficient to permit diffusion of said sugar into said coated fruit pieces to provide sugar infused fruit pieces, air drying said sugar infused fruit pieces to a moisture content of between 30 and 40% moisture based on the wet weight of the fruit pieces to provide air dried fruit pieces, and then vacuum microwave drying said fruit pieces in a first stages by applying microwave power of between 1 and 8 KW/Kg of wet fruit pieces at a vacuum pressure of at least 22 inches Hg for a time required to reduce the moisture content to between 15 and 20% moisture based on the wet weight of the fruit pieces followed by applying a second stage of microwave vacuum drying at a microwave power level no greater than 2 KW/Kg of fruit pieces and at a vacuum pressure of at least 22 inches of Hg. to produce a dried mango and/or pineapple fruit pieces having significantly improved texture and flavor substantially free of cooked flavor.

2. A process as defined in claim 1 wherein said temperature is lower than 60° C.

3. A process as defined in claim 1 wherein said microwave power applied in said first stage is 3 to 5 KW/Kg.

4. A process as defined in claim 2 wherein said microwave power applied in said first stage is 3 to 5 KW/Kg.

5. A process as defined in claim 1 wherein said vacuum pressure applied in said first and second stages is at least 25 inches Hg.

6. A process as defined in claim 2 wherein said vacuum pressure applied in said first and second stages is at least 25 inches Hg.

7. A process as defined in claim 3 wherein said vacuum pressure applied in said first and second stages is at least 25 inches Hg.

* * * * *